(12) United States Patent
Dmitriev

(10) Patent No.: US 7,165,242 B2
(45) Date of Patent: Jan. 16, 2007

(54) METHODS AND SYSTEMS FOR REDUCING PERFORMANCE OVERHEAD OF CODE INSTRUMENTATION BASED PROFILING

(75) Inventor: Mikhail Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 855 days.

(21) Appl. No.: 10/170,183

(22) Filed: Jun. 12, 2002

(65) Prior Publication Data

US 2003/0182654 A1   Sep. 25, 2003

Related U.S. Application Data

(60) Provisional application No. 60/365,631, filed on Mar. 19, 2002.

(51) Int. Cl.
*G06F 9/45* (2006.01)
(52) U.S. Cl. ..................................................... 717/130
(58) Field of Classification Search ................ 717/151, 717/127, 124, 130
See application file for complete search history.

(56) References Cited

U.S. PATENT DOCUMENTS 5,815,720 A * 9/1998 Buzbee ....................... 717/158
6,934,935 B1 * 8/2005 Bennett et al. ............. 717/127
6,957,422 B1 * 10/2005 Hunt .......................... 717/130

* cited by examiner

*Primary Examiner*—John Chavis
(74) *Attorney, Agent, or Firm*—Sonnenschein, Nath & Rosenthal LLP

(57) ABSTRACT

A profiling program determines a set of routines that impacts the performance of a selected root routine. Because the set of routines impacts the performance of the routine of interest, the members of the set are excellent candidates for profiling in order to more precisely measure the performance the selected root routine. Thus, routines that cannot be reached from the root routine need not be profiled, thereby reducing the amount of profiling code injected into a target program, and thereby reducing execution inefficiency of the target program.

15 Claims, 2 Drawing Sheets

METHODS AND SYSTEMS FOR REDUCING PERFORMANCE OVERHEAD OF CODE INSTRUMENTATION BASED PROFILING

CROSS-REFERENCE TO RELATED APPLICATIONS

This application claims the benefit of, and incorporates by reference in its entirety, Provisional Application Ser. No. 60/365,631 titled "Methods And Systems For Reducing Performance Overhead Of Code Instrumentation Based Profiling", filed Mar. 19, 2002.

FIELD OF THE INVENTION

This invention relates to performance analysis of programs running in a data processing system. In particular, the present invention relates to reducing performance overhead of code instrumentation based profiling of programs running in a data processing system.

BACKGROUND OF THE INVENTION

Profiling is a general term for techniques that allow software developers to collect data on various characteristics of a running program (a "target program"). The collected data can then be used to understand what parts of the target program need improvement. For example, the developer may measure how much time the target program takes to execute each subroutine and how many times the target program calls each subroutine.

With this information, the developer can determine in which subroutine(s) the target program spends most of its execution time. The developer can then direct optimization first to the most frequently exercised subroutines.

One popular profiling technique is called code instrumentation. When code instrumentation is used to profile a target program, the developer inserts (or "injects") special sequences of code in selected areas in the target program.

For example, the developer may inject a small piece of start code that starts a clock or timer counting before the very first instruction of a subroutine. The developer may than also inject a similar piece of stop code that stops the clock or timer immediately before each instruction of the subroutine that returns control back to another part of the target program.

As a more specific example, the start code and the stop code may be calls to special user-supplied "methodEntry" and "methodExit" routines. The methodEntry routine notes the current system time and stores its value (e.g., T0) in a memory record created for the selected subroutine in the target program. Just before the selected subroutine exits, the selected subroutine calls the methodExit routine. The methodExit routine then obtains the current system time (e.g., T1), calculates the difference (T1−T0) and stores the difference as a final result in the record for the selected subroutine.

In a similar fashion, the developer may inject profiling code at other interesting places in the target program. Thus, the developer may inject profiling code where the target program allocates objects in memory, performs input/output, and the like. The developer can manually inject the code, or may instead use a system application often referred to as a "profiler". A profiler typically also supports controlled execution of the target program as well as presentation of the collected data.

Code instrumentation based profiling suffers from a major disadvantage, however: performance overhead. The injected profiling code in the target program necessarily slows down the target program. The slow down can be very significant, often reducing the execution speed of the target program several times.

One reason for the slow down is that injected profiling code needs time to execute. Another, more subtle, reason is that the injected profiling code in the target program may often preclude optimizations that a compiler could otherwise perform on the target program. As one example, a short subroutine can, in many cases, be optimized by replacing the subroutine call (and the attendant subroutine call overhead) with the actual subroutine code instead (i.e., "inlining" the subroutine).

However, the presence of profiling code in the short subroutine makes the subroutine much longer. With increased length comes increased unsuitability for inlining. Thus, optimization opportunities may be lost.

Therefore, a need has long existed for code instrumentation profiling of target programs that overcomes the problems noted above and others previously experienced.

SUMMARY OF THE INVENTION

Methods and systems consistent with the present invention provide a profiling program for obtaining valuable feedback on the execution of a selected root routine. This profiling program selectively determines those portions of a target program for which profiling code is appropriate, and introduces profiling code that measures performance of the selected root routine. The profiling program avoids injection of extraneous profiling code, thereby reducing the inefficiencies generally associated with code instrumentation profiling of a target program.

Methods and systems consistent with the present invention overcome the shortcomings of the related art, for example, by allowing a profiling program to determine a set of routines that impact the performance of a selected root routine. The profiling program injects profiling code into one or more members of the set of routines in order to collect execution performance measurements for the selected root routine. The profiling program avoids adding unnecessary profiling code to the target program (e.g., to subroutines that do not impact the performance of the root routine), thereby allowing the target program to execute without undue delays caused by unneeded profiling code.

In accordance with methods consistent with the present invention, a method is provided for code based instrumentation of a target program running in the data processing system. The method includes selecting a root routine in a target program to profile, identifying a transitive closure of routines called by the root routine, and adding profiling code into at least a portion of the transitive closure of routines of the target program.

In accordance with systems consistent with the present invention, a data processing system is provided. The data processing system includes a memory comprising a profiling program for determining a root routine to profile, identifying a transitive closure of routines called by the root routine, and adding profiling code into at least a portion of the transitive closure of routines. The data processing system further includes a processor that runs the profiling program.

In accordance with articles of manufacture consistent with the present invention, a computer-readable medium is provided. The computer-readable medium contains instructions that cause a data processing system to perform a method for code based instrumentation of a target program running in the data processing system. The method includes selecting a root routine in a target program to profile, identifying a first portion of the target program called directly by the root routine, identifying a second portion of the target program called transitively by the root routine, and adding profiling code into the first portion and second portion of the target program.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying drawings.

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

Figure 1:
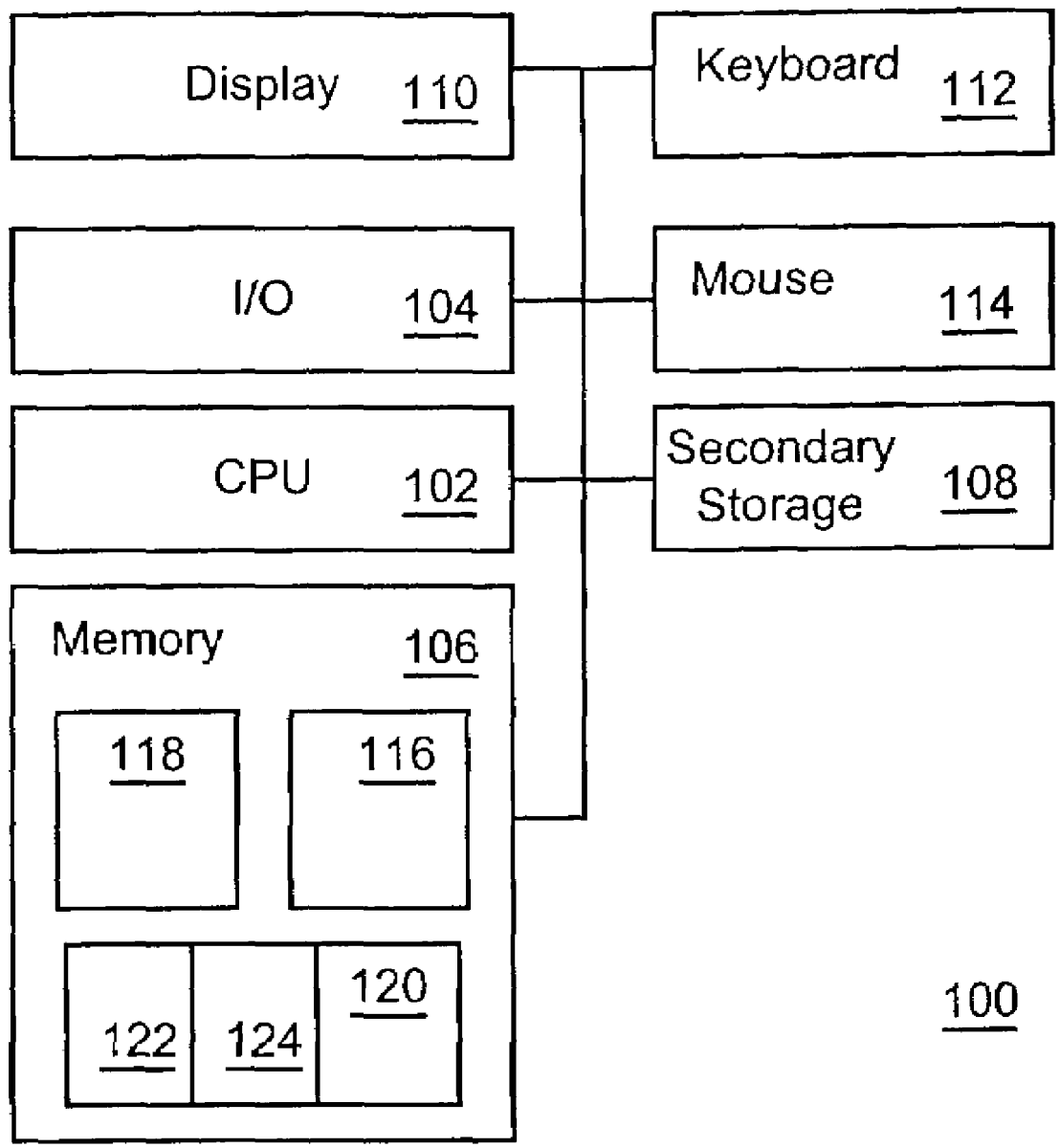
FIG. 1 depicts a block diagram of a data processing system suitable for practicing methods and implementing systems consistent with the present invention.

FIG. 1 depicts a block diagram of a data processing system 100 suitable for practicing methods and implementing systems consistent with the present invention. The data processing system 100 comprises a central processing unit (CPU) 102, an input output I/O unit 104, a memory 106, a secondary storage device 108, and a video display 110. The data processing system 100 may further include input devices such as a keyboard 112 or a mouse 114.

The memory 106 contains a profiling program 116 that injects profiling code into a target program 118 and that stores profiling measurements in the profiling data structure 120. The target program 116 represents any program running on the data processing system 100. As examples, the target program 118 may be a word processor, a low level operating system program, or a spreadsheet application. The profiling program 116 may be part of an operating system, or it may comprise a program independent of the operating system (e.g., a standalone program development tool). The profiling data structure 120 includes profiling fields 122, 124 that store individual profiling measurements (e.g., elapsed execution time, CPU time, I/O throughput, and the like) for one or more subroutines in the target program 116 .

Although aspects of the present invention are depicted as being stored in memory 106, one skilled in the art will appreciate that all or part of systems and methods consistent with the present invention may be stored on or read from other computer-readable media, for example, secondary storage devices such as hard disks, floppy disks, and CD-ROMs; a signal received from a network such as the Internet; or other forms of ROM or RAM either currently known or later developed. Further, although specific components of data processing system 100 are described, one skilled in the art will appreciate that a data processing system suitable for use with methods, systems, and articles of manufacture consistent with the present invention may contain additional or different components.

The profiling program 116 helps a developer more precisely target portions of the target program 118 for profiling.

The profiling program 116 also presents the results of the profiling in human-readable form (e.g., using a graphical user interface, or using an output file formatted to easily identify the results). Rather than injecting profiling code at every subroutine entry and exit, for example, the profiling program identifies a subset of routines that impacts a portion (e.g., a subroutine) of the target program 118 in which the developer is interested. To that end, the profiling program 116 makes use of the observation that in many instances, the portion (e.g., a subset of routines) of the target program 118 that the developer wants to profile are those routines that are called directly or transitively by a small number of, or just one "root" routine.

For the purposes of this discussion, the routine C is said to be called transitively by routine A, when routine A calls one or more intermediate routines that eventually call routine C. For example, routine A may call routine B1 which calls routine B2 which calls routine C. In this example, routine A calls routine C transitively. As noted above, the profiling program 116 adds profiling code to those portions of the target program 118 that are called directly or transitively by the root routine. In other words, rather than injecting profiling code at every subroutine entry and exit, the profiling program 116 identifies a subset of routines that ultimately determine the performance of the root routine specified by the developer.

The observation holds in many instances because execution of a first subroutine typically represents an isolated piece of work. Thus, the routines called by the first routine in turn typically represent smaller isolated parts of the same piece of work.

Individual developers of a single target program 118 are often responsible for different pieces of work done by the target program 118. The work is performed by routines that may be scattered about many different libraries, modules, subroutines, and the like. As a result, simply selecting routines from a single module or library for profiling may not result in a selection of routines that includes those routines that substantially impact the performance of the root routine. This is particularly true in situations where single modules or libraries hold only a single type of routine (e.g., memory management or I/O routines).

On the other hand, a transitive closure of routines that can be called by a selected root routine to be profiled is an exact subset of the target program 118 that impacts the performance of the selected root routine. The transitive closure of routines is the set of all routines (regardless of the library or module in which they reside) that can be called by the selected root routine directly or transitively. As a result, profiling a transitive closure of routines called by the root routine generally provides more relevant information to the developer, who is typically interested in profiling a piece of work (as it crosses library boundaries) as opposed to a single library of routines.

More generally, the profiling program 116 determines, starting from a selected root routine "R", a subset of routines "S" in the target program 118 that are reachable from the selected root routine. The members of S are those routines that impact the performance of R and may be determined by iteratively examining R, and each routine called by R, to identify what routines can be reached from R. A complete set of the routines reachable from R is the transitive closure of routines as explained above. However, the subset S need not include each routine in the transitive closure. Rather the subset S may include only routines selected by the developer for specific reasons, for example, the selected routines are the longest, or generally are the most CPU intensive, or have the most I/O, and so forth.

Because they impact the performance of R, the members of S are excellent candidates for profiling in order to more precisely measure the performance of the selected root routine R. Routines that cannot be reached from the root routine R need not be profiled, thereby reducing the amount of profiling code overhead injected into the target program 118, and thereby reducing execution inefficiency of the target program 118.

In other words, the profiling program 116 first determines a subset of the target program 118 for profiling. Then, the profiling program 116 injects profiling code into that subset of the target program 118. For instance, once the profiling program 116 determines a subset of routines that impact the selected root routine, the profiling program 116 may then insert profiling code that obtains performance information for one or more members of that subset of routines. As examples, the profiling code may be code that measures the start time, end time, memory usage, CPU usage, I/O performance, and the like of one of more of the routines in the subset of routines, and that stores the measurements in the profiling data structure 120.

The profiling code injected into the members of S (other than the root routine R itself) collects profiling measurements for routines that are called directly or transitively by R. The routines in which profiling code is injected need not always be called through R, however, because R need not be the topmost level routine of the target program 118. In other words, other routines in the target program 118 may call members of S that have been determined to impact the performance of R. For example, one of the members of S may be a commonly used input/output routine used by many other parts of the target program 118.

The profiling program 116 therefore takes steps to avoid collecting profiling measurements when other parts of the target program 118 invoke members of S. In particular, the injected profiling code is informed that R is the root routine. In one embodiment, a global boolean flag may be set to TRUE by the profiling code in R (or by the profiling program 116) each time execution of the target program 118 enters the root routine R. The global boolean flag is set to FALSE when execution leaves R.

The profiling code may then check the flag to determine whether to collect measurements. In other words, if the flag is TRUE, the profiling code may proceed to collect measurements, while if the flag is FALSE, the profiling code may take no measurements and may terminate immediately.

The profiling program 116 functions equally well with multi-threaded target programs. In particular, the profiling program 116 may maintain separate instances of the boolean flag for each thread of the target program, distinguished by thread identifiers assigned by the operating system. The profiling code then checks the appropriate flag for its thread, based on the thread identifier.

Figure 2:
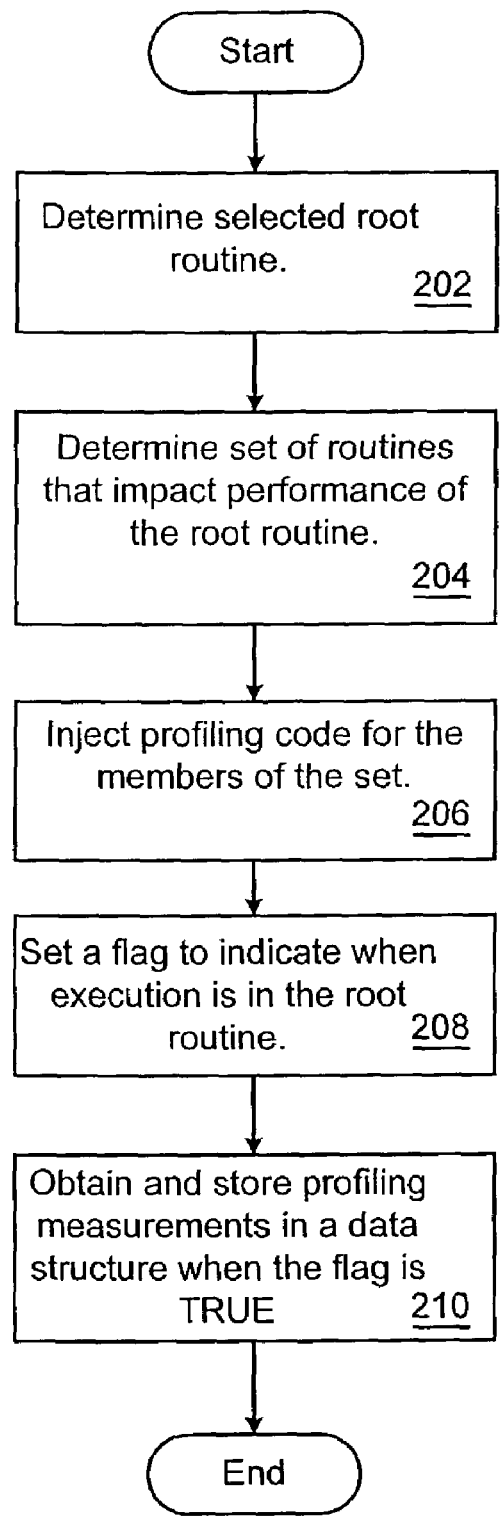
FIG. 2 depicts a flow diagram showing processing performed by the profiling program running in the data processing system shown in FIG. 1 in order to add profiling code in the target application running in the data processing system.

Turning next to FIG. 2, that figure depicts a flow diagram 200 that shows processing performed by the profiling program 116 running in the data processing system 100. The profiling program 116 determines the selected root routine (step 202) of a target program 118. For instance, a developer may indicate with a mouse selection, keyboard input, or the like, which routine in the target program 118 is the routine for which to gather profiling information.

The profiling program 116 then determines a set of routines that impact the performance of the root routine (step 204). As one example, the profiling program 116 may determine the transitive closure of routines that can be called by the root routine. More generally, the profiling program 116 may determine one or more subroutines called by or reachable from the root routine.

Having determined a set of routines that impact the root routine, the profiling program 116 may then inject profiling code into one or more members of the set of routines (step 206). The profiling code may be code that measures the routine entry time, exit time, memory usage (e.g., memory allocation and de-allocation), CPU usage, I/O performance, I/O usage, elapsed time between one or more instructions or functions in the routine, and the like.

The profiling program 116 then monitors execution of the target program 118 in order to determine when execution enters the root routine. The profiling program 116, or the profiling code in the root routine, sets a flag to indicate that execution has entered the root routine (step 208). As a result, the injected profiling code makes profiling measurements when the flag is TRUE, and may then store the results in the profiling fields in the profiling data structure 120 (step 210).

Note that the profiling program 116 may perform either static or dynamic instrumentation. With static instrumentation, the profiling program 116 injects the profiling code into the target program 118, recompiles the target program (if necessary), then runs the target program 118. For example, given a Java routine shown below:

public void x( ) {System.out.println("Target Routine");}

The profiling program 116 injects profiling code as shown below to measure execution time of the routine:

public void x( )
{
startTimer( );
System.out.println("Target Routine");
stopTimerAndPrintElapsedTime( );
}

The profiling program 116 may also perform dynamic instrumentation. With dynamic instrumentation, the profiling program 116 again inserts the profiling code, but does so at a time when the target program 118 is already running. In other words, the profiling program 116 modifies the target program 118 during execution of the target program 118.

One advantage of dynamic profiling is that the profiling program 116 may start the target program 118 and then inject and remove profiling code (e.g., "startTimer( )") when the developer chooses to do so, but without the need to stop and then re-start the target program 118. Thus, not only may the profiling program 116 insert profiling code at selected times, but it may also remove the code once a measurement has been obtained to eliminate any performance impact caused by the profiling code as the target program 118 continues to execute.

As another example, consider the pseudo code shown below:

```
Main( )
    {// Main entrypoint routine for the application
        R( );
        X( );
        Y( );
    }
R( )
{
    X( );
    Z( );
}
X( ) { dosomething1; }
Y( ) { dosomething2; }
Z( ) { dosomething3; }
```

By scanning the program code for R( ), with R( ) the selected root routine, the profiling program 116 determines that R( ), X( ) and Z( ) should be instrumented. Note that X( ) is also called directly from Main( ). Thus, when Main( ) calls X( ), the profiling program 116 should not collect profiling information. For that reason, the profiling program 116 may use a global flag (e.g., the global flag PA in the example below) to prevent the target program from emitting profiling information in those circumstances. More specifically, after instrumentation, the profiling program 116 modifies the target program as follows:

```
R( )
{
    PA = TRUE; // Inserted profiling code
    EmitMethodEntryEvent; // Inserted profiling code
    X( );
    Z( );
    EmitMethodExitEvent; // Inserted profiling code
    PA = FALSE; // Inserted profiling code
}
X( )
{
    if (PA == TRUE) EmitMethodEntryEvent; // Inserted profiling code
    dosomething1;
    if (PA == TRUE) EmitMethodExitEvent; // Inserted profiling code
}
Z( )
{
    if (PA == TRUE) EmitMethodEntryEvent; // Inserted profiling code
    dosomething3;
    if (PA == TRUE) EmitMethodExitEvent; // Inserted profiling code
}
```

Thus, PA is TRUE and measurements are taken only when R( ) (the selected root routine) is responsible for calling X( ) and Z( ).

As explained above, the profiling program 116 determines a set of routines that impacts the performance of a selected root routine. Because the set of routines impacts the performance of the routine of interest, the members of the set are excellent candidates for profiling in order to more precisely measure the performance the selected root routine. Thus, routines that cannot be reached from the root routine need not be profiled, thereby reducing the amount of profiling code overhead injected into a target program, and thereby reducing execution inefficiency of the target program.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems.

What is claimed is:

1. A method in a data processing system for instrumenting a target program comprising routines running in the data processing system, the method comprising the steps of:
   indicating a routine in the target program as a root routine to profile;
   identifying a transitive closure of routines that may be called by the root routine;
   selecting at least one routine of the transitive closure of routines; and
   selectively adding profiling code into the selected at least one routine of the transitive closure of routines, the profiling code being dynamically added to the target program while the target program is executing.

2. The method according to claim 1, wherein:
   the step of identifying a transitive closure includes the steps of identifying the routines of the target program called directly by the root routine and wherein the step of adding profiling code comprises the step of adding profiling code into the selected routines called directly by the root routine.

3. The method according to claim 1, wherein:
   the step of identifying a transitive closure includes the steps of identifying the routines of the target program called transitively by the root routine and wherein the step of adding profiling code comprises the step of adding profiling code into the selected routines called transitively by the root routine.

4. The method according to claim 1, wherein the step of adding profiling code comprises the step of adding execution time measurement code into the selected at least one routine of the transitive closure of routines.

5. The method according to claim 1, further comprising the step of executing the target program and collecting profiling measurements.

6. A computer-readable medium containing instructions that cause a data processing system to perform a method for instrumenting of a target program comprising routines running in the data processing system, the method comprising the steps of:
   indicating a routine in the target program as a root routine to profile;
   identifying a transitive closure of routines that may be called by die root routine;
   selecting at least one routine of the transitive closure of routines; and selectively adding profiling code into the selected at least one routine of the transitive closure of routines, the profiling code being dynamically add to the target program while the target program is executing.

7. The computer-readable medium of claim 6, wherein the step of adding profiling code comprises the step of adding execution time measurement code into the selected at least one routine of the transitive closure of routines.

8. The computer-readable medium of claim 6, wherein adding further comprises adding profiling flag code in the root routine.

9. A data processing system comprising:
   a memory comprising a profiling program for indicating a root routine of a target program to profile, identifying a transitive closure of routines that may be called by the root routine, selecting at least one routine of the transitive closure of routines, and selectively adding profiling code to the selected at least one routine in the transitive closure of routines, the profiling code being dynamically added to the target program while the target program is executing; and
   a processor that runs the profiling program.

10. The data processing system of claim 9, wherein the transitive closure of routines includes first routines called directly by the root routine and second routines called transitively by the root routine.

11. The data processing system of claim 9, wherein the profiling code comprises execution time measurement code.

12. The data processing system of claim 9, wherein the profiling program adds profiling code into each selected routine in the transitive closure of routines.

13. A data processing system comprising:
   means for selecting a root routine in a target program to profile;
   means for identifying a transitive closure of routines that may be called by the root routine;
   means for selecting at least one routine in the transitive closure of routines; and means for selectively adding profiling code into the selected at least one routine in the transitive closure of routines of the target program, the profiling code being dynamically added to the target program while the target program is executing.

14. A method in a data processing system for code based instrumentation of a target program running in the data processing system, the method comprising the steps of:

selecting a root routine in a target program to profile;

identifying a transitive closure of routines that may be called by the root routine;

creating a data structure in memory, the data structure comprising profiling fields for storing profiling measurements for at least a selected portion of the transitive closure of routines;

selectively adding profiling code into each routine in the selected portion of the transitive closure of routines, the profiling code being dynamically added to the target program while the target program is executing; and during execution of the target program, collecting profiling measurements obtained with the profiling code; and storing the profiling measurements in the data structure.

15. The method according to claim 14, wherein:

the step of adding profiling code comprises the step of adding execution time measurement profiling code.

\* \* \* \* \*